Jan. 17, 1967    F. MINERVINI ET AL    3,298,145
INVISIBLE MOLDING FASTENER
Filed Sept. 24, 1964    2 Sheets-Sheet 1
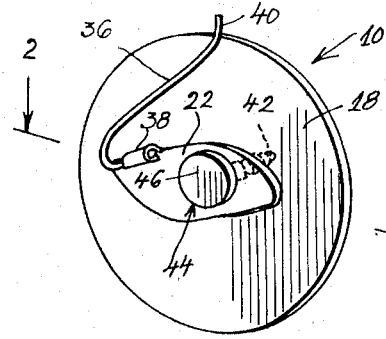
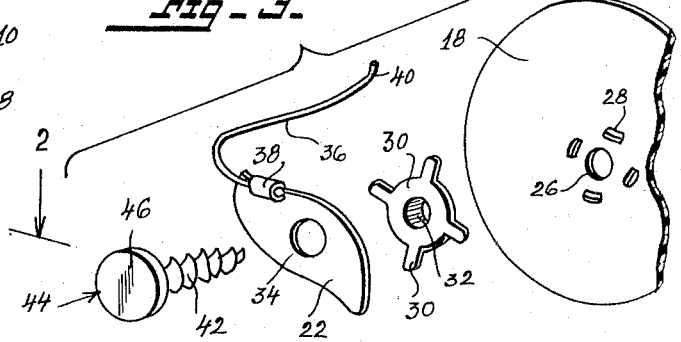
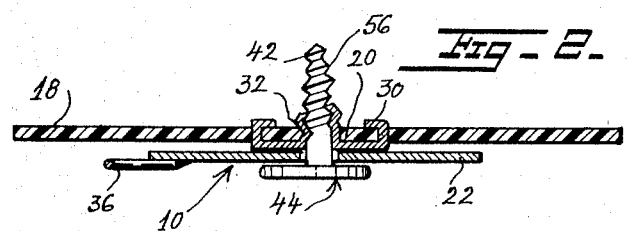
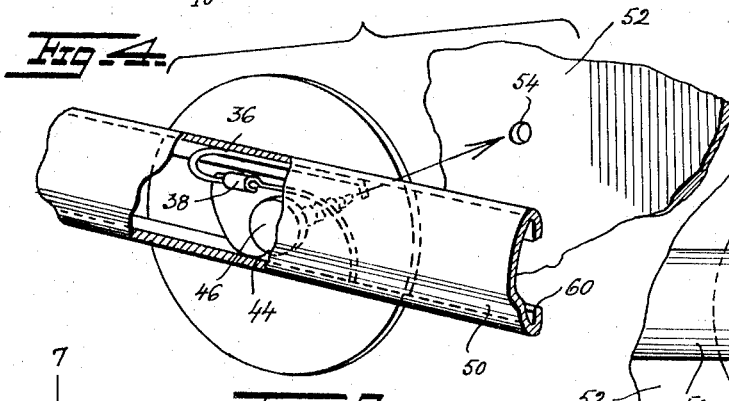
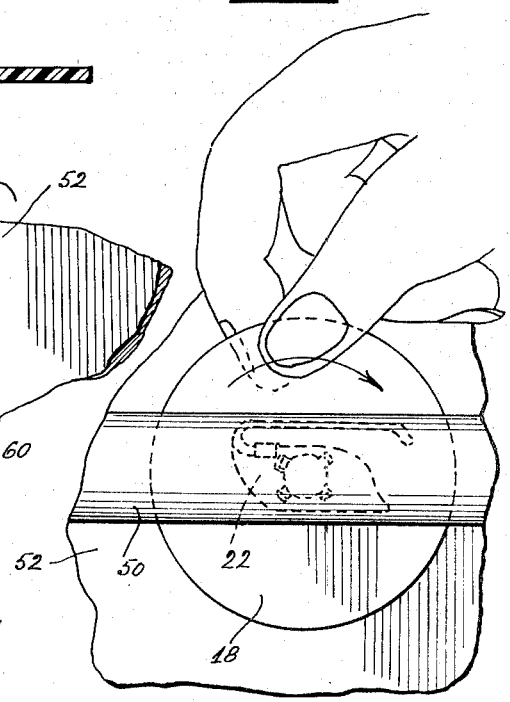
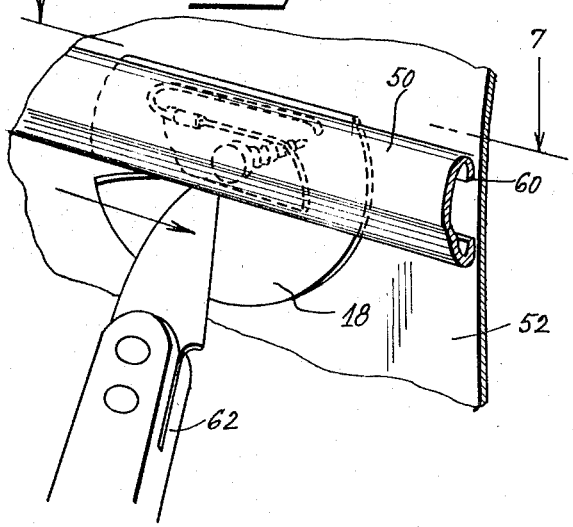
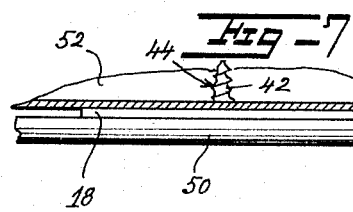
INVENTORS
FRANK MINERVINI &
THEODORE FUGEL
BY
Polachek & Saulsbury
ATTORNEYS.

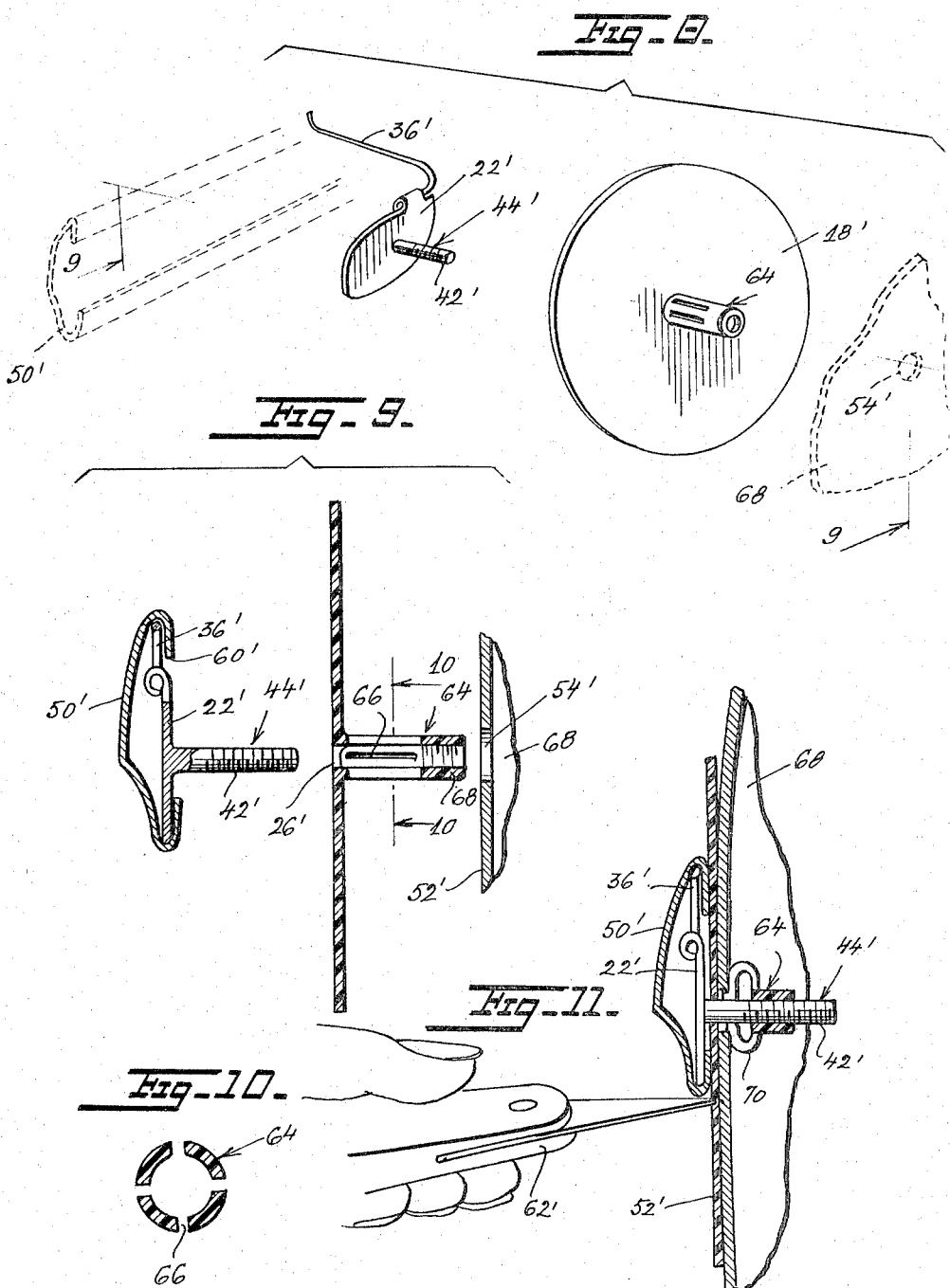

United States Patent Office 3,298,145
Patented Jan. 17, 1967

3,298,145
INVISIBLE MOLDING FASTENER
Frank Minervini, Woodstock, N.Y. 12498, and
Theodore Fugel, West Shokan, N.Y. 12494
Filed Sept. 24, 1964, Ser. No. 399,035
5 Claims. (Cl. 52—127)

This invention relates generally to devices for turning fastening elements and particularly to a device for turning a screw in an inaccessible place.

In the mounting of strips of molding and the like on metal surfaces found on various articles such as the bodies of automobiles, automobile doors, and the like, it is customary to fasten the molding by means of fastening elements such as metal screws. In such molding operations, the fastening element must be hidden from view so as not to mar the appearance of the article. This presents difficulties. The usual expedient resorted to is to perforate the surface, fasten the head of the screw to the molding so that the shank of the screw projects radially thereof and then insert the shank through a hole in the surface into a nut held against the other side of the surface around the hole. Often there is no clearance for the hand to hold such a nut.

It is an important object of the present invention to eliminate the necessity of using both hands in the fastening operation and to eliminate the necessity for the use of extraneous fastening devices such as nuts and the like.

A principal object of the present invention is to provide an attachment for the shank of a turnable fastening element whereby the element may be turned even if concealed and inaccessible.

Another object of the invention is to provide a device for turning a turnable screw even if concealed and inaccessible which device is adapted to be trimmed for purpose of concealment, after the turning operation is completed.

A specific object of the invention is to provide a screw with a thin circular tearable disc fixed to the shank adjacent the head of the screw, said disc being dimensioned so as to extend beyond the article being fastened by the screw for purpose of grasping for turning, said extension adapted to be torn off of the disc.

The invention is illustrated in connection with a narrow strip of molding that it is desired to fasten to a flat surface such as the body or door of an automobile, but it is understood that it is applicable to other articles and situations.

For further comprehension of the invention and of the objects and advantages thereof reference will be had to the following description and accompanying drawings and to the appended claims in which the various novel features of the invention are more particularly set forth.

In the accompanying drawings forming a material part of this disclosure:

FIGURE 1 is a top plan view of a headed screw with an attachment embodying the invention applied thereto.

FIG. 2 is an enlarged cross sectional view taken on the line 2—2 of FIG. 1.

FIG. 3 is a disassembled perspective view thereof, parts being broken away.

FIG. 4 is a perspective view of a strip of molding preparatory to being secured to a flat metal surface, by means of the parts shown in FIG. 1, being shown broken away.

FIG. 5 is a top plan view showing the strip of molding of FIG. 4 in position on the supporting surface, showing the attachment grasped by the hand of the operator preparatory to turning in the direction of the arrow for securement of the strip to the surface.

FIG. 6 is a front elevational view showing the strip of molding in secured position and the attachment about to be trimmed for the purpose of concealment.

FIG. 7 is a sectional view taken on the plane of the line 7—7 of FIG. 6.

FIG. 8 is a disassembled perspective view of a screw with an attachment embodying a modified form of the invention, the molding and door fragments being shown in dash lines.

FIG. 9 is a sectional view taken along the line 9—9 of FIG. 8.

FIG. 10 is a cross-sectional view taken on the line 10—10 of FIG. 9.

FIG. 11 is a vertical sectional view showing the strip of molding in secured position and the disc about to be trimmed for the purpose of concealment.

Referring now in detail to the various views of the drawings, in FIG. 1 a fastening element attachment is illustrated and designated generally at 10. The attachment comprises broadly a disc 18, a spiked washer member 20 and a leaf-shaped bearing member 22. The disc 18 is plastic and circular of the order of 2⅞ inches in diameter and wafer thin. A circular hole 26 is formed in the center of the disc and a series of spaced slots 28 is formed therearound in annular formation. The washer is circular in shape with radial spokes 30 and with perforated hub 32 in the center thereof adapted to extend through the central hole 26 in the disc. The spokes 30 are adapted to be inserted through the slots 28 in the disc and bent to prevent withdrawal. The leaf-like bearing member 22 has a central hole 34 adapted to register with the central holes in the disc and washer. The bearing member 22 seats loosely on the washer 20. The bearing member carries a spring wire 36 of round thin stock. One end of the wire is curved and secured in a tubular bearing member 38 formed integrally with the edge of the bearing member adjacent one end thereof. The wire extends laterally of the body of the bearing member and is slightly curved at its outer free end as indicated at 40. The wire is bendable and springy. The attachment is shown applied to the shank 42 of a screw 44 having a head 46. The shank of the screw extends through the central aligned holes and is welded or otherwise fastened to the hub 32 of the washer member 20. The head of the screw seats on the bearing member 22.

In use, for example in fastening a strip 50 of molding to a flat metal surface such as the surface 52 of an automobile door, a hole 54 is formed in the material of the door, the edge of the hole forming a thread. The diameter of the hole is approximately the diameter of the wider portion of the shank of the screw so that the edge of the hole coacts with the threads 56 on the shank of the screw when the shank is turned.

The bearing member 22 with its wire 36 is inserted through the space between the long edges 60 of the molding 50, the spring wire having first been pressed close to the edge of the body of the bearing member as shown in FIG. 4. The distance between the long edges 60 of the molding permits this operation. After insertion and after release of pressure on the spring wire, the wire springs laterally away from the body of the bearing member into clamping engagement with adjacent side of the molding as seen in FIG. 4. The disc 18 remains on the outside of the molding, spanning the space between the long edges of the molding. The diameter of the disc 18 is greater than the width of the molding 50 so that a considerable area of the disc projects beyond both long edges of the molding as seen in FIG. 5. The molding is then placed over the hole 54 in the door 52, for example, and the protruding shank of the screw 44 is inserted loosely through the hole, until the edge of the hole engages the threads of the shank. In order to drive the screw home from this point on, it is merely necessary to grasp the protruding peripheral edge of the disc by the fingers, as shown in FIG. 5 and turn the disc in the proper direction, such as shown by the arrow in FIG. 5, which turning will be transmitted to the shank of the screw for driving the screw home in the hole of the door. When the screw and molding are in secure position, the disc 18 may be trimmed by cutting off the excess exposed portion thereof along the long sides of the molding by means of a tool such as a knife 62 shown in FIG. 6. The molding 50 is thus securely fastened to the door 52.

Referring now to the modification of the invention shown in FIGS. 8 to 11, inclusive, in this form the screw 44' is without a head and its threaded shank 42' is formed integrally with the leaf-like bearing member 22'. The disc 18' is formed with an elongated tubular hub portion or sleeve 64 extending radially from the central hole 26' thereof. The hub portion 64 is integral with the flexible disc 18' and is formed with spaced elongated slits 66 extending along its inner end, the outer end being solid and formed with internal screw threads 68.

In use, for example, in fastening a strip of molding 50' to a metal surface such as the surface 52' of an automobile door 68, a hole 54' is formed in the material of the door. The diameter of the hole is slightly larger than the diameter of the hub portion 64 to permit the hub portion to pass therethrough.

The bearing member 22' with its wire 36' and carrying the screw 44' is inserted through the space between the long edges 60' of the molding 50', the spring wire having first been pressed close to the edge of the body of the bearing member. The spring presses the bearing member into clamping engagement with the adjacent side of the molding. The shank 42' of the screw is inserted through the hole 26' of the disc 18' and through the hub portion 64 until the outermost threads on the shank engage the innermost threads 68 on the hub portion. The hub portion 64 with the shank 42' of the screw therein is then inserted through the hole 54' in the door 68. By grasping the peripheral edge of the disc 18' and turning the same, the shank of the screw by reason of its engagement with the threads 68 will move inwardly through the hole in the door causing the solid threaded portion of the hub portion to move toward the disc 18' thereby collapsing and buckling the slitted portion of the hub portion into an annular loop 70 which seats against the inner surface of the door thereby clamping the door to the disc 18' as shown in FIG. 11., and securing the molding 50' to the door. The exposed portion of the disc 18' may be removed by a cutting tool 62' as shown in FIG. 11.

While we have illustrated and described the preferred embodiments of our invention, it is to be understood that we do not limit ourselves to the precise construction herein disclosed and that various changes and modifications may be made within the scope of the invention as defined in the appended claims.

What is claimed is:

1. A turning attachment for a headed screw comprising a circular disc member having a central hole and a series of slots in annular formation around the hole, the shank of the screw extending through said hole, a washer around the shank between the head of the screw and the disc, a hub on said washer welded to the shank, spokes radiating from the periphery of the washer and extending through the slots in the disc, the outer ends of the spokes being bent for fastening the disc to the washer.

2. A turning attachment for a headed screw comprising a circular disc member having a central hole and a series of slots in annular formation around the hole, the shank of the screw extending through said hole, a washer around the shank between the head of the screw and the disc, a hub on said washer welded to the shank, spokes radiating from the periphery of the washer and extending through the slots in the disc, the outer ends of the spokes being bent for fastening the disc to the washer, and an elongated bearing member loosely mounted around the shank between the washer and disc, said bearing member carrying means for clamping the attachment to a split tubular member.

3. A turning attachment for a headed screw comprising a circular disc member having a central hole and a series of slots in annular formation around the hole, the shank of the screw extending through said hole, a washer around the shank between the head of the screw and the disc, a hub on said washer welded to the shank, spokes radiating from the periphery of the washer and extending through the slots in the disc, the outer ends of the spokes being bent for fastening the disc to the washer, and an elongated bearing member loosely mounted around the shank between the washer and disc, said bearing member carrying a spring wire radiating from one long edge thereof at one end of the member.

4. In combination with an elongated split tubular molding strip, a screw assembly carried by the strip, said assembly including a screw having a head and a threaded shank, the head being disposed inside the strip and the shank projecting outwardly of the strip, a washer member around the shank of the screw and welded thereto, inside the strip, a circular disc around the projecting portion of the shank, an elongated loose bearing member around the shank between the washer and head of the screw inside the strip, and a clamping wire carried by said bearing member and clampingly engaging the side of the tubular molding strip on the inside thereof, the projecting threaded portion of the shank of the screw adapted to be received in a threaded hole in a member for securing the molding strip thereto by turning of the disc.

5. In combination with an elongated split tubular molding strip, a screw assembly carried by the strip, said assembly including a screw having a head and a threaded shank, the head being disposed inside the strip and the shank projecting outwardly of the strip, a washer member around the shank of the screw and welded thereto, inside the strip, a circular disc around the projecting portion of the shank, an elongated loose bearing member around the shank between the washer and head of the screw inside the strip, and a clamping wire carried by said bearing member and clampingly engaging the side of the tubular molding strip on the inside thereof, the projecting threaded portion of the shank of the screw adapted to be received in a threaded hole in a member for securing the molding strip thereto by turning of the disc, said disc being formed of flexible tearable plastic material adapted to be cut and trimmed along the edges of the molding strip.

References Cited by the Examiner

UNITED STATES PATENTS

| | | | |
|---|---|---|---|
| 2,544,522 | 3/1951 | Bertelsen | 85—61 X |
| 2,645,317 | 7/1953 | Staaf | 287—189.36 |
| 2,729,134 | 1/1956 | Stanton et al. | 85—61 |
| 3,120,686 | 2/1964 | Pickering | 52—718 X |

FRANK L. ABBOTT, *Primary Examiner.*

R. S. VERMUT, *Assistant Examiner.*